United States Patent [19]

Farrow

[11] Patent Number: 5,621,661
[45] Date of Patent: Apr. 15, 1997

[54] INDUCTIVE LOOP DIAGNOSTIC INTERFACE

[75] Inventor: Cyril A. Farrow, Pietermaritzburg, South Africa

[73] Assignee: Electromatic (Proprietary) Limited, Pietermaritzburg, South Africa

[21] Appl. No.: 285,119

[22] Filed: Aug. 3, 1994

[30] Foreign Application Priority Data

Aug. 4, 1993 [ZA] South Africa ............................ 93/5634

[51] Int. Cl.⁶ ............................ H04B 10/00; G08G 1/042
[52] U.S. Cl. ............................................ 364/516; 340/941
[58] Field of Search .................................. 364/516, 550, 364/436–438; 340/870.01, 870.07, 870.16, 870.28, 870.29, 933, 941

[56] References Cited

U.S. PATENT DOCUMENTS

| 4,398,172 | 8/1993 | Carroll et al. | .................. 340/870.28 X |
| 4,430,636 | 2/1984 | Bruce | ..................................... 340/941 |
| 4,566,008 | 1/1986 | Powers et al. | . |

FOREIGN PATENT DOCUMENTS 1462054  1/1977  United Kingdom .

Primary Examiner—Emanuel T. Voeltz
Assistant Examiner—Edward Pipala
Attorney, Agent, or Firm—Spencer & Frank

[57] ABSTRACT

A method of obtaining data relating to the performance of an inductive loop detector wherein a light source is modulated with a signal which is dependent on the data and the modulated signal is remotely detected and data extracted therefrom is stored for later processing.

4 Claims, 1 Drawing Sheet

INDUCTIVE LOOP DIAGNOSTIC INTERFACE

BACKGROUND OF THE INVENTION

This invention relates to a data interface for transferring information relating to the performance of an inductive loop detector of the kind used for detecting the passage or presence of vehicles. The information which is transferred relates to the operation, and to the fault diagnosis, of the detector which consists of an inductive loop and a detector unit to which the loop is connected.

It is known to provide a vehicle detector of the kind described with a visual output indicator and to pulse or flash the indicator slowly to transmit information on the status of the inductive loop detector, thereby to transfer such information to an operator. The pulse rate is sufficiently low to ensure that a human operator may observe and count or evaluate the pulses. The transmission of information in this way may be initiated by the operator and, after the transmission is completed, the inductive loop detector resumes normal operation.

It is known to extract information from an inductive loop vehicle detector by means of a physical electrical connection made directly thereto. The information is normally, but is not limited to, data gathered by the detector relating to the passage or presence or vehicles, for example vehicle counts.

The first mentioned technique is of necessity slow and laborious and is subject to human failing. On the other hand the second technique, although it does not unduly interfere with the normal operation of the detector, is inappropriate for reasons of complexity, inconvenience and cost.

SUMMARY OF THE INVENTION

The invention is concerned with the transfer of extensive operational and diagnostic information in respect of an inductive loop vehicle detector without the limitations which exist in presently utilised data transfer methods.

The invention provides, in the first instance, a method of transferring data from an inductive loop vehicle detector, which data relates to the operation of the detector, the method including the steps of: generating the data, modulating at least one visual output means with a signal which is dependent on the generated data, detecting emission from the modulated visual output means thereby to produce an output signal, storing data extracted from the output signal, and retrieving the stored data.

The retrieved data may be displayed to an operator, transferred to a computer for data collection or processing, transferred to a hard copy device, or used in any other appropriate desired manner.

The generated data may first be stored and the said modulating signal may then be dependent on the stored generated data.

The visual output means may be repetitively modulated with the said signal.

The modulation may take place at a rate which is sufficiently high to prevent fluctuations in the intensity of the emission from the modulated visual output means from being readily discernible to the human eye. The visual output means may for example be pulsed at an average frequency which may vary from 50 Hz up to 3600 Hz. The modulation may be done in a 'burst' mode depending on other processing tasks which are being undertaken simultaneously by a processor in the apparatus. The modulation rate and the data content are such that it is not humanly possible to interpret the information.

The invention also provides a device for receiving data relating to the performance of an inductive loop vehicle detector which includes light sensitive detection means adapted to detect intensity variations in at least one modulated light emission, means responsive to the light sensitive detection means to produce an output signal which is dependent on the modulated light emission, data storage means for storing data extracted from the output signal, and means for retrieving data from the data storage means.

The invention also provides a system which includes transmitting apparatus and a device for receiving data, the transmitting apparatus including an inductive loop, a loop signal source for energizing the loop, control means for monitoring, and for generating data relating to, the operation of the loop and the signal source, memory means for storing the generated data, and visual output means which, under the control of the control means, is modulated with a signal which is dependent on the stored generated data thereby to produce a modulated light emission, and the device for receiving data including light sensitive detection means adapted to detect intensity variations in the said modulated emission, means responsive to the light sensitive detection means to produce an output signal which is dependent on the modulated emission, data storage means for storing data extracted from the output signal, and means for retrieving data from the data storage means.

The invention also extends to transmitting apparatus which includes an inductive loop, a loop signal source for energizing the loop, control means for monitoring, and for generating data relating to, the operation of the loop and the signal source, memory means for storing the generated data, and visual output means which, under the control of the control means, is modulated with a signal which is dependent on the stored generated data at a rate which is sufficiently high to prevent resultant fluctuations in the intensity of an emission from the visual output means from being readily discernible to the human eye.

BRIEF DESCRIPTION OF THE DRAWINGS

The invention is further described by way of example with reference to the accompanying drawings in which.

DESCRIPTION OF PREFERRED EMBODIMENT

Figure 1:
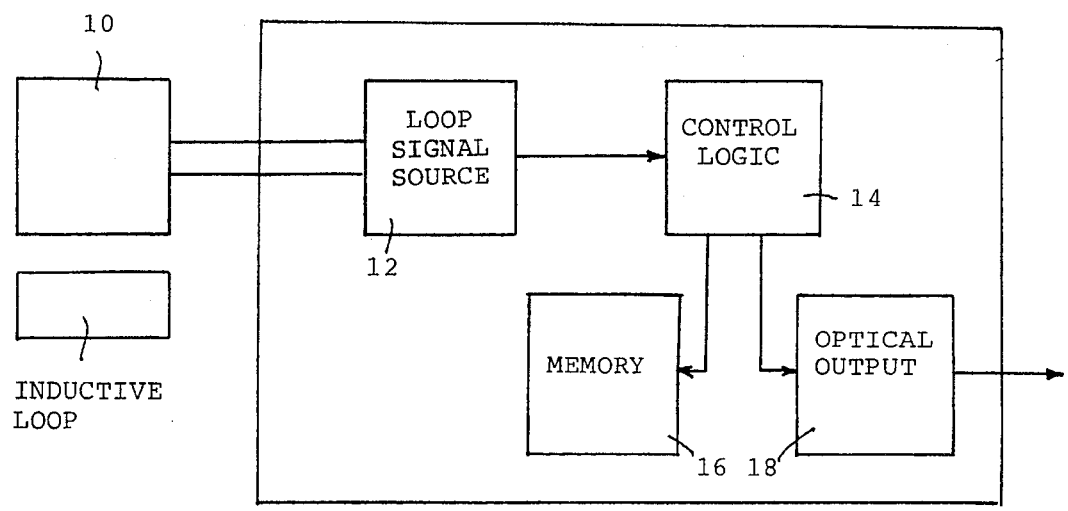
FIG. 1 is a block diagram of transmitting apparatus which includes an inductive loop vehicle detector adapted for optically transmitting information relating to the operation of the vehicle detector.

FIG. 1 of the accompanying drawings illustrates in block diagram form an inductive loop 10, a loop signal source 12 for energizing the loop, control logic 14, a memory unit 16 and an optical output 18.

The components 10 to 16 are used in a known way to detect the passage or presence of a vehicle. For this reason further details of these components, and the way in which they operate, are not described.

The optical output 18 may include one or more light emitting diodes and is chosen to function in a desired frequency range e.g. in the visible or infrared frequency range.

Figure 2:
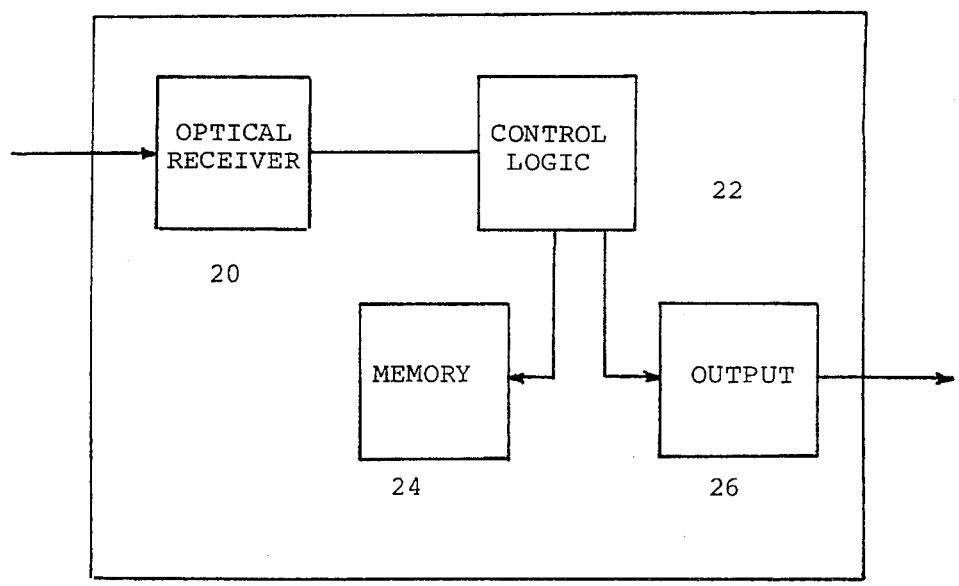
FIG. 2 is a block diagram of a device, which is separate from the apparatus of FIG. 1, for receiving information transmitted by the transmitting apparatus and for storing and presenting the received information.

The receiving device shown in FIG. 2 includes an optical receiver 20, control logic 22, a memory unit 24 and output means 26 for outputting data retrieved from the memory 24. The output 26 could for example comprise a printer, a numeric or alphanumeric display, an output data port, or take on any other suitable form.

In use of the apparatus of FIG. 1 information relating to the operation of the inductive loop vehicle detector is generated under the control of the logic unit 14 and stored in the memory unit 16. This information could relate to a variety of factors including, for example, the frequency of excitation of the loop, variations in such frequency, possible fault conditions, and so on.

The optical output 18 is repetitively modulated by the stored information, under the control of the control logic 14. This however is not essential for transmission of the modulated signal could be triggered by means of an external switch or signal, or in any other way.

The device shown in FIG. 2 is remote from the optical output 18. Preferably the device is portable and is hand held.

The device is brought close to the apparatus of FIG. 1 and the optical receiver 20 is exposed to the modulated emission of the optical output 18. Data transfer from the transmitting apparatus to the receiving device then takes place. The received information is processed by the control logic 22 and stored in the memory unit 24. The stored information may be accessed at any time and, depending on the nature of the output 26, the data may be displayed to the operator, transferred to a computer for purposes of data collection or processing, or transferred to a hard copy device. These variations are given merely by way of example.

The techniques used for storing the information, modulating the optical output, de-modulating the transmitted optical signal, storing, retrieving and presenting the information, are known in the art and hence are not further described herein.

It is desirable to transfer the data at a high rate so that the time required for data transfer is limited to an acceptable period. A suitable data transfer rate is achieved when the optical output is modulated at an average pulse frequency of which may vary from 50 Hz up to 3600 Hz. Transmission normally takes place in a 'burst' mode depending on other processing tasks which are being undertaken at the time by a processor of the apparatus. At this modulation rate and due to the nature of the data content, it is not humanly possible to interpret the information. Variations in the intensity of the optical output emission are not readily discernible to the human eye at this rate.

The merit of the invention lies in the fact that operating and diagnostic information is transferred by optical means from the transmitter to the receiver which is a remote and separate device. The technique enables transfer and presentation of extensive information regarding the operation of a vehicle detector installation in an economical manner which does not require significant modifications to the original detector design and construction.

I claim:

1. An inductive loop vehicle detector comprising:
   an inductive loop mountable in a pavement structure; and
   a detector unit connected to the loop wherein the detector unit includes:
   a signal source for energizing the loop;
   control means for monitoring the loop and generating diagnostic data relating to operation of the loop and the signal source;
   memory means for storing the diagnostic data generated; and
   optical output means for producing an optical output signal, the optical output means being controlled by the control means so that the optical output signal is repetitively modulated by a modulation signal based on the stored diagnostic data at a rate such that the data is not discernible by a human.

2. A data receiving device for use in receiving diagnostic data relating to performance of an inductive loop vehicle detector, the detector including an inductive loop and a detector unit connected to the loop having an optical output means for emitting a modulated optical signal, the data receiving device comprising:
   optical energy receiving means for receiving the modulated optical signal emitted from the optical output means of the detector unit,
   demodulating means for extracting data from the modulated optical signal, the data being associated with a signal used to modulate the optical output means in the detector unit;
   data storage means for storing the data extracted by the demodulating means; and
   means for retrieving the stored data from the data storage means.

3. A system for transferring diagnostic data relating to an inductive loop vehicle detector, the system comprising:
   an inductive loop vehicle detector; and
   a data receiving device;
   wherein the inductive loop vehicle detector includes:
   an inductive loop mountable in a pavement structure; and
   a detector unit connected to the loop, the detector unit having a signal source for energizing the loop, control means for monitoring the loop and generating diagnostic data relating to operation of the loop and the signal source, memory means for storing the diagnostic data generated, and optical output means for emitting a modulated optical output signal, the optical output means being controlled by the control means so that the optical output signal is modulated by a modulation signal based on the stored diagnostic data at a rate such that the data is not discernible by a human; and
   wherein the data receiving device includes:
   optical energy receiving means for receiving the modulated optical signal emitted from the optical output means of the detector unit,
   demodulating means for extracting data from the modulated optical signal, the data being associated with the signal used to modulate the optical output means in the detector unit;
   data storage means for storing the data extracted by the demodulating means; and
   means for retrieving the stored data from the data storage means.

4. A method of transferring diagnostic data from an inductive loop vehicle detector having an inductive loop and a detector unit connected to the loop, the method comprising:
   continually generating diagnostic test data relating to performance of the loop;

storing the generated diagnostic test data in a memory of the detector;

repetitively modulating at least one optical signal output device with the stored data to emit a modulated optical signal, the modulation being at a rate wherein the data is not discernible by a human viewing the emitted modulated optical signal;

detecting with a portable data reading device the emitted modulated optical signal and extracting the data therefrom;

storing data extracted with the reading device; and retrieving the extracted data.

\* \* \* \* \*